United States Patent [19]
Oertley

[11] Patent Number: 6,012,784
[45] Date of Patent: Jan. 11, 2000

[54] IMPACT REDUCING IDLER WHEEL FOR A TRACK-DRIVEN MACHINE

[75] Inventor: Thomas E. Oertley, Dunlap, Ill.

[73] Assignee: Caterpillar Inc., Peoria, Ill.

[21] Appl. No.: 09/016,765

[22] Filed: Jan. 30, 1998

[51] Int. Cl.⁷ .................. B60B 17/00; B60B 9/00
[52] U.S. Cl. .................. 305/137; 305/136; 305/195
[58] Field of Search .................. 305/136, 137, 305/194, 195, 199; 152/47, 48; 295/11

[56] References Cited

U.S. PATENT DOCUMENTS

| | | | |
|---|---|---|---|
| 2,074,341 | 3/1937 | Piron | 295/11 |
| 2,525,333 | 10/1950 | Augustin | 152/47 |
| 2,911,252 | 11/1959 | Templeton | 295/11 |
| 2,923,570 | 2/1960 | Jorn et al. | 295/11 |
| 2,954,259 | 9/1960 | Kordes | 295/11 |
| 2,999,717 | 9/1961 | Reuter et al. | 295/11 |
| 3,797,895 | 3/1974 | Tomizawa | 305/27 |
| 3,958,837 | 5/1976 | Chagawa | 305/21 |
| 3,989,314 | 11/1976 | Reinsma et al. | 305/28 |
| 4,458,966 | 7/1984 | Stensson et al. | 339/10 |
| 4,818,041 | 4/1989 | Oertley | 305/56 |
| 4,998,783 | 3/1991 | Erlenmaier et al. | 305/56 |
| 5,022,718 | 6/1991 | Diekevers | 305/24 |
| 5,139,317 | 8/1992 | Larson et al. | 305/12 |
| 5,161,866 | 11/1992 | Johnson | 305/24 |
| 5,183,306 | 2/1993 | Emilsson | 295/11 |
| 5,207,489 | 5/1993 | Miller | 305/56 |

FOREIGN PATENT DOCUMENTS

| | | | |
|---|---|---|---|
| 6138068 | 10/1981 | Japan | 305/137 |
| 2011548 | 4/1994 | Russian Federation | 305/136 |

*Primary Examiner*—Russell D. Stormer
*Attorney, Agent, or Firm*—John J. Cheek

[57] ABSTRACT

An impact reducing idler wheel comprises a retaining ring and a tread ring having a pair of mutually-spaced tread surfaces separated by a radially outwardly open annular groove. The retaining ring is positioned within the radially outwardly open annular groove. A first resilient member is disposed between the retaining ring and the tread ring. A central hub is concentric with the tread ring, and a second resilient member is disposed between the hub and the tread ring. The tread ring may comprises a plurality of arcuate segments which are independently movable relative to the hub and the retaining ring.

9 Claims, 4 Drawing Sheets

Fig_2_

IMPACT REDUCING IDLER WHEEL FOR A TRACK-DRIVEN MACHINE

TECHNICAL FIELD

This invention relates generally to idler wheels and more particularly to impact reducing idler wheels for a track-driven machine.

BACKGROUND ART

Current track-driven machines use an endless track and chain assembly to provide load distribution and propulsion within a track system. A track system typically consists of a track roller frame, a plurality of rollers, one or more idler wheels, a driving wheel or sprocket, and a chain assembly. The chain assembly consists of track shoes connected to links to form an endless loop which encircles the track roller frame, the idler wheel(s) and the driving wheel. The track system typically utilizes one or two idler wheels, which provide a reasonably low friction load point for the chain to bend around and also provide a guiding means to keep the chain from moving out of alignment. Such idler wheels may be a one piece cast design or a welded fabrication and are mounted to the track roller frame. Due to the harsh environment these machines are used in, the track system are typically made from steel or cast iron. In operation, a significant amount of noise and vibration is generated as a result of the idler impacting the track links through rotation of the track.

Some idler wheel designs known in the art utilize a resilient material between an outer track link engagement ring or tread ring and a central hub. The resilient material is positioned between these two members to dampen the impact as the tread ring comes in contact with the track links. Some of these designs utilize a rigid one piece tread ring. Although this design may provide some dampening of the impact between the tread ring and the track links, it does not provide sufficient dampening for other track system designs. Other idler wheel designs utilize an outer retaining ring rigidly connected to the tread ring, with the tread ring being either segmented or one piece, and a resilient member positioned between the tread ring and a hub. Still other track systems are designed to have the outer retaining ring contact the track link connecting pins or bushings, which results in unwanted noise and vibration caused by the impact of these members.

The present invention is directed to overcoming one or more of the problems as set forth above.

DISCLOSURE OF THE INVENTION

In one aspect of the present invention, an impact reducing idler wheel for a track-drive machine includes a retaining ring and a tread ring having a pair of mutually-spaced tread surfaces separated by a radially outwardly open annular groove. The impact reducing idler wheel further includes a first resilient member disposed between the retaining ring and the tread ring. A central hub is concentric with the tread ring, and a second resilient member is disposed between the hub and the tread ring.

In another aspect of the present invention, the tread ring comprises a plurality of arcuate segments.

Other features and advantages of this invention will become apparent from the following description and the accompanying drawings.

BEST MODE FOR CARRYING OUT THE INVENTION

Figure 1:
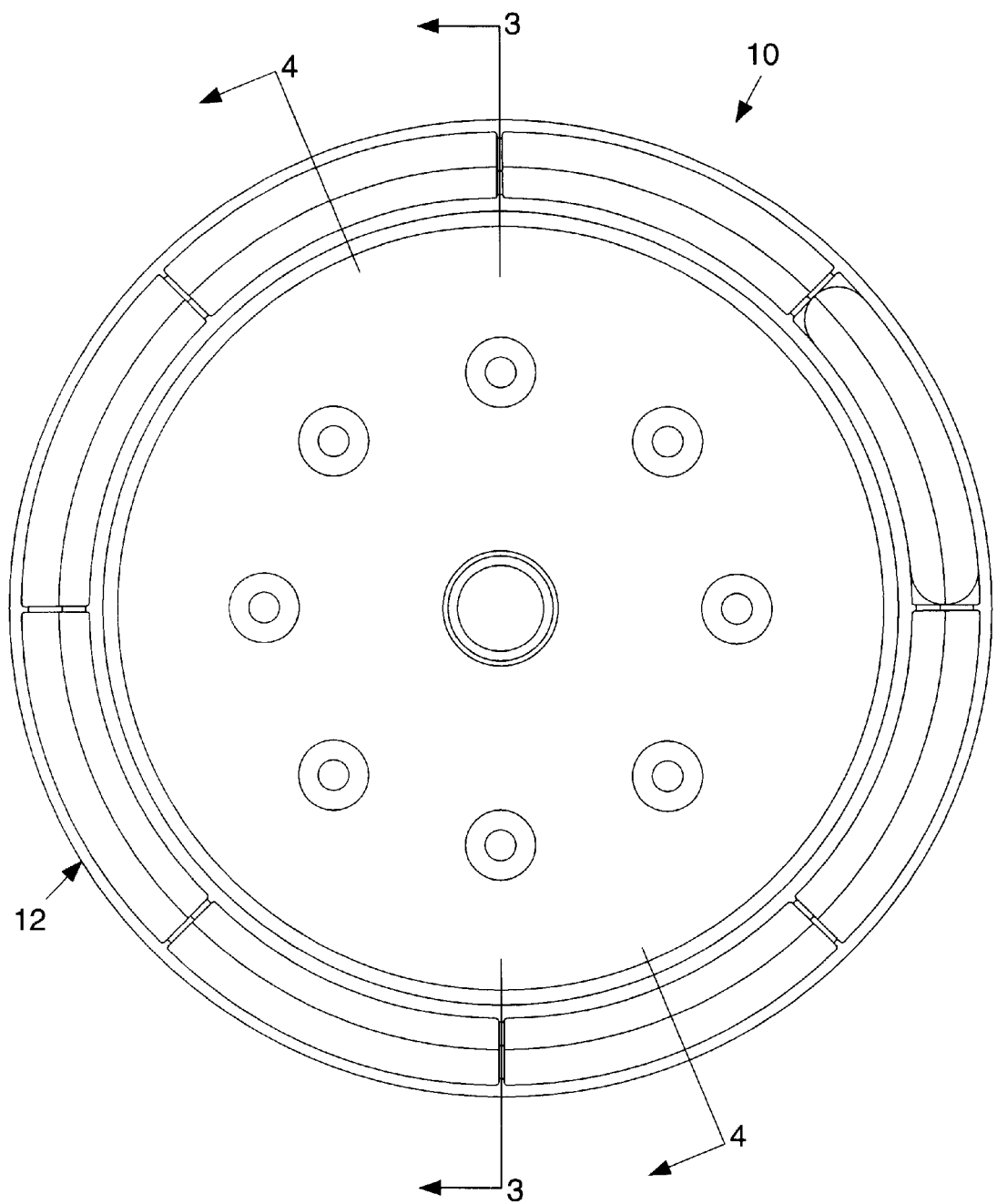
FIG. 1 is a side elevational view of the impact reducing idler wheel assembly in accordance with the present invention.
Figure 2:
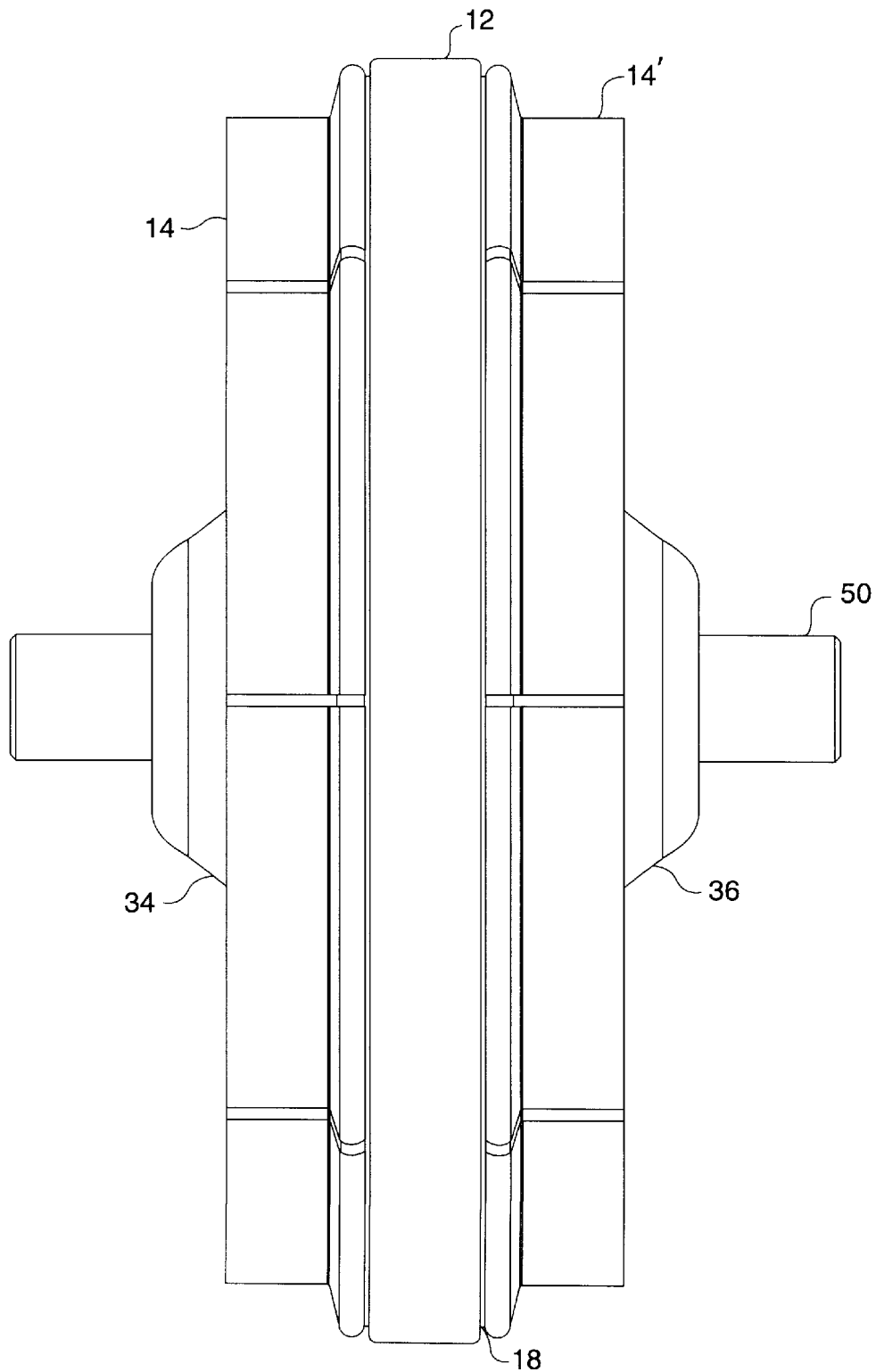
FIG. 2 is a plan view of the impact reducing idler wheel assembly of FIG. 1.

Referring to the drawings, an impact reducing idler wheel 10 for a tracked machine (not shown) comprises a circular one piece retaining ring 12, a tread ring 14 comprising of a plurality of arcuate segments 14', and a central hub 16. A first resilient member 18 is positioned between the retaining ring 12 and the tread ring 14. A second resilient member 20 is positioned between the hub 16 and the tread ring 14.

Figure 3:
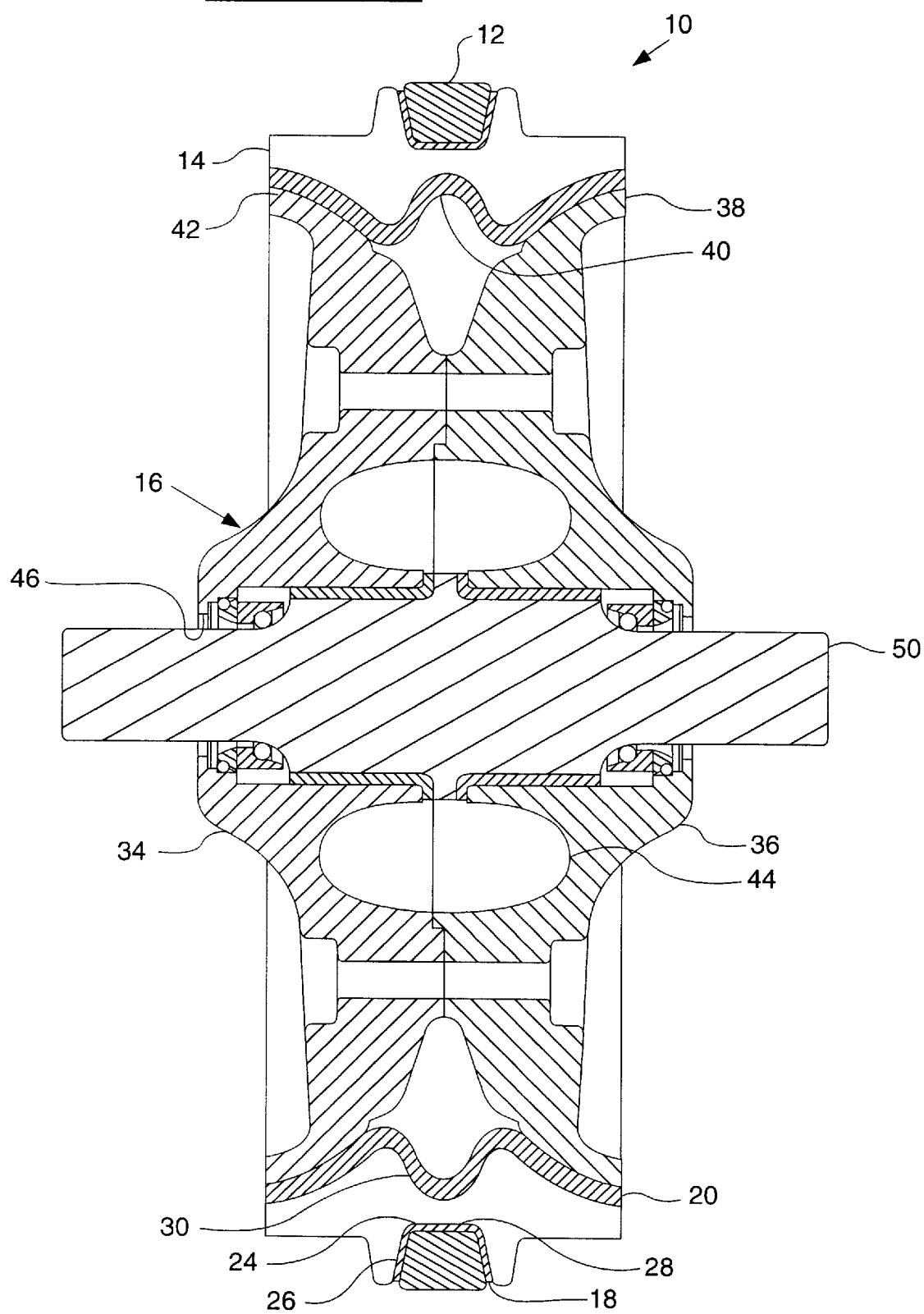
FIG. 3 is a sectional view of the impact reducing idler wheel assembly taken along line 3—3 of FIG. 1.
Figure 4:
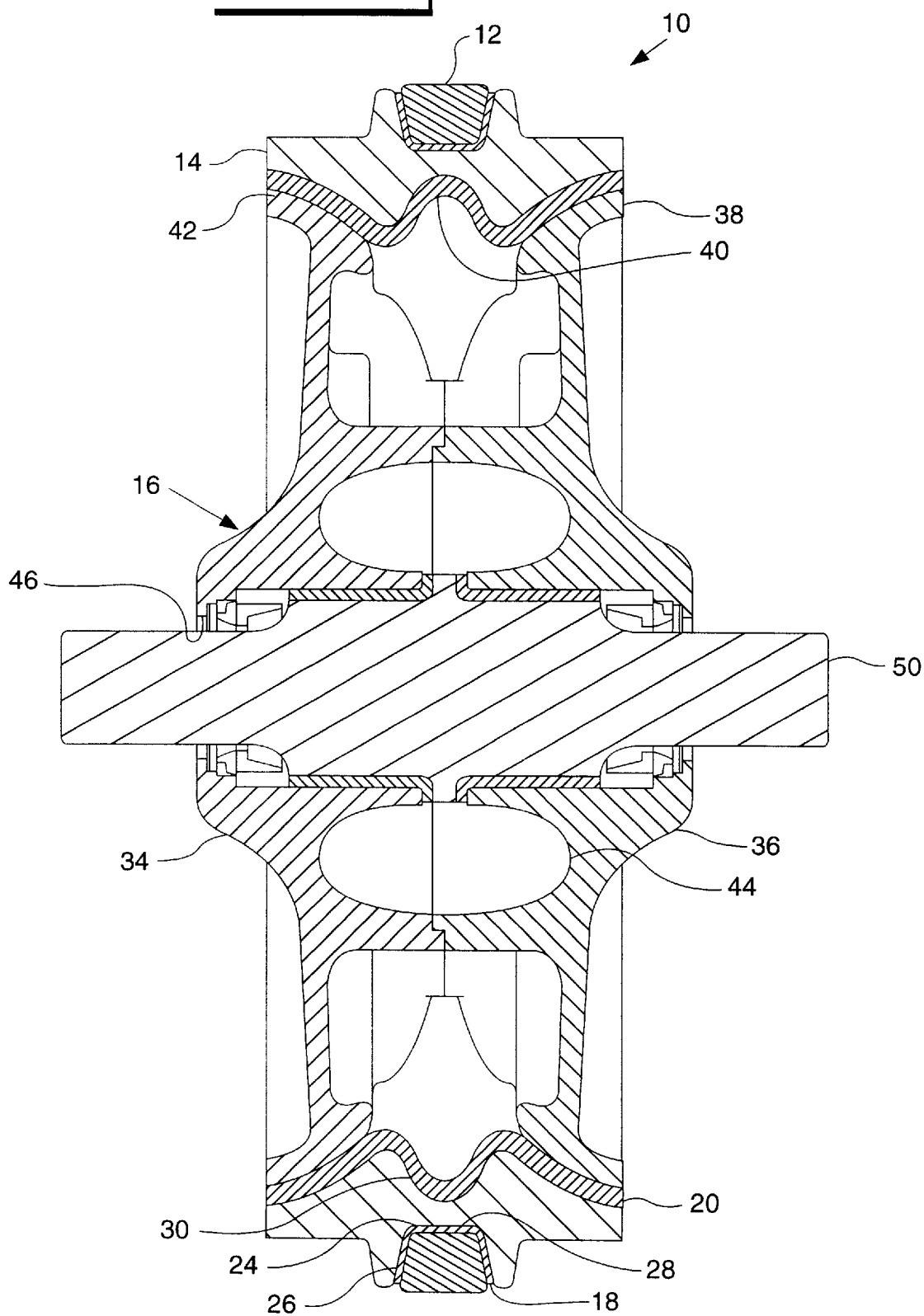
FIG. 4 is a sectional view similar to FIG. 3 but taken along line 4—4 of FIG. 1.

The tread ring 14 comprises a plurality of arcuate segments 14' which have mutually-spaced tread surfaces 22 that are separated by a channel or generally "U" shaped peripheral groove 24. The groove 24 has sidewalls 26 and a floor 28. The first resilient member 18, which may advantageously be formed from rubber or the like, is positioned against the inner circumferential surface 30 of the retaining ring 12 and extends around the sides of the retaining ring 12, as shown in FIGS. 3 and 4. The tread ring 14 is assembled by concentrically positioning the arcuate segments 14' within the retaining ring 12. This is done by positioning the arcuate segments 14' one at a time such that the retaining ring 12 and the first resilient member 18 are seated within the "U" shaped groove 24. For ease of assembly, it is preferred that the first resilient member 18 is one continuous piece and is also a pre-formed shape which conforms substantially to the shape of the retaining ring 12 and the "U" shaped groove 24. However, it should be noted that the first resilient member 18 could comprise plural segments, which may correspond in length to the tread ring segments 14'. In these cases, the resilient member segments would first be positioned within the "U" shaped groove 24 of the tread segments 14', and the tread ring 14 would then be assembled by concentrically positioning the arcuate segments 14' to receive the retaining ring 12, as described above.

The second resilient member 20, which may also be formed from rubber or the like, is positioned against the inner circumferential surface 30 of the tread ring 14. First and second hub members 34, 36 are concentrically positioned within the tread ring 14 such that the arcuate rim portion 38 of the first and second hub members 34, 36 conform substantially to the arcuate contour of the inner circumferential surface 30 of the tread ring 14. The middle portion 40 of the inner circumferential surface 30 of the tread ring 14 extends substantially radially inwardly of the outer portion 42 of the inner circumferential surface 30 of the tread ring 14, thereby allowing the hub 16 to retain the tread ring 14 in position. The first and second hub members 34, 36 are fastened together by a plurality of axial bolts (not shown) or by welding to form the central hub 16. In order to obtain optimum dampening and wear characteristics, it is also preferred that the second resilient member 20 be a unitary member having a pre-formed shape which conforms substantially to the shape of the inner circumferential surface 30 of the tread ring 14 and outer surface of the first and second hub members 34, 36, respectively. However, as mentioned above for the first resilient member 18, the second resilient member 20 could also comprise plural segments.

Referring particularly to FIGS. 3 and 4, an annular reservoir 44 is provided within the central hub 16 and encircles a radially centered bore 46 extending axially through the hub 16. A support shaft 50 extends through the bore 46, and the hub 16 is rotatable about the shaft 50. Suitable bearings and seals are also provided between the shaft 50 and the hub 16, as well known to those skilled in the art. A lubricant, such as oil (not shown), is supplied to the reservoir 44 through a suitable filler adapter (not shown). The lubricant is allowed to travel to the bore 46 to provide adequate lubricant to the bearing surfaces.

INDUSTRIAL APPLICABILITY

An impact reducing idler wheel 10 in accordance with this invention is particularly useful with earth moving machines, such as a track-type tractor or hydraulic excavator, incorporating an endless track and chain assembly (not shown) to provide load distribution and propulsion within the track system. As the idler wheel's metal surfaces come in contact with the metal components of the track assembly, noise and vibration are a result of the impact of these components.

In certain instances, the retaining ring 12 of the idler wheel 10 will impact transverse pins or bushings (not shown) of the track assembly. Because the retaining ring 12 is isolated from the tread ring 14 by the first resilient member 18, the first resilient member 18 provides cushioning and dampening of the impact for the aforementioned components. Similarly, the tread surfaces 22 of the tread ring 14 are typically engaged by the track links (not shown) of the track assembly. This engagement is cushioned by the second resilient member 20. The segmented structure of the tread ring 14 also contributes to this dampening.

Although the presently preferred embodiments of this invention have been described, it will be understood that within the purview of the invention various changes may be made within the scope of the following claims.

I claim:

1. An impact reducing idler wheel for a track-driven machine, comprising:

a retaining ring;

a tread ring having a pair of mutually-spaced tread surfaces separated by a radially outwardly open annular groove, said retaining ring being positioned within said radially outwardly open annular groove;

a first resilient member disposed between said retaining ring and said tread ring;

a central hub concentric with said tread ring; and a second resilient member disposed between said hub and said tread ring.

2. The idler wheel as set forth in claim 1 wherein said tread ring comprises a plurality of arcuate segments.

3. The idler wheel as set forth in claim 2 wherein each of said arcuate segments are independently movable relative to said hub and said retaining ring.

4. The idler wheel as set forth in claim 1 wherein said hub comprises first and second hub members.

5. The idler wheel as set forth in claim 2 wherein said hub comprises first and second hub members.

6. The idler wheel as set forth in claim 3 wherein said hub comprises first and second hub members.

7. The idler wheel as set forth in claim 1 wherein said first resilient member comprises a unitary rubber ring.

8. The idler wheel as set forth in claim 1 wherein said second resilient member comprises a unitary rubber ring.

9. The idler wheel as set forth in claim 1 wherein said groove has a base and wherein said first resilient member is disposed between the base of said groove and a radially-inwardly facing surface of said retaining ring.

* * * * *